US010031872B1

(12) United States Patent
Friedman (10) Patent No.: US 10,031,872 B1
(45) Date of Patent: Jul. 24, 2018

(54) STORAGE IN MULTI-QUEUE STORAGE DEVICES USING QUEUE MULTIPLEXING AND ACCESS CONTROL (71) Applicant: E8 Storage Systems Ltd., Ramat-Gan (IL)

(72) Inventor: Alex Friedman, Hadera (IL)

(73) Assignee: E8 STORAGE SYSTEMS LTD., Ramat-Gan (IL)

( * ) Notice: Subject to any disclaimer, the term of this patent is extended or adjusted under 35 U.S.C. 154(b) by 0 days.

(21) Appl. No.: 15/847,992

(22) Filed: Dec. 20, 2017

Related U.S. Application Data (60) Provisional application No. 62/449,131, filed on Jan. 23, 2017.

(51) Int. Cl.
*G06F 15/167* (2006.01)
*G06F 13/28* (2006.01)
*G06F 3/06* (2006.01)
*H04L 29/06* (2006.01)
*H04L 29/08* (2006.01)

(52) U.S. Cl.
CPC .......... *G06F 13/287* (2013.01); *G06F 3/0601* (2013.01); *G06F 3/067* (2013.01); *G06F 3/0613* (2013.01); *G06F 3/0659* (2013.01); *H04L 63/20* (2013.01); *H04L 67/1097* (2013.01)

(58) Field of Classification Search
CPC .............. H04L 29/08549; H04L 63/00; H04L 67/1097; H04L 67/2842; G06F 3/06; G06F 3/0601; G06F 3/0659; G06F 3/067; G06F 13/287
See application file for complete search history.

(56) References Cited

U.S. PATENT DOCUMENTS

| 6,446,220 | B1 | 9/2002 | Menon |
| 6,584,517 | B1 | 6/2003 | Raza |
| 8,095,763 | B2 | 1/2012 | Piszczek et al. |
| 8,510,265 | B1 | 8/2013 | Boone et al. |
| 8,595,385 | B1 | 11/2013 | Shapiro et al. |
| 8,725,934 | B2 | 5/2014 | Batwara et al. |
| 8,812,450 | B1 | 8/2014 | Kesavan et al. |

(Continued)

FOREIGN PATENT DOCUMENTS

WO 2013024485 A2 2/2013

OTHER PUBLICATIONS

Kalia et al., "Using RDMA Efficiently for Key-Value Services", Proceedings of the 2014 ACM conference on SIGCOMM, 15 pages, Aug. 17-22, 2014.

(Continued)

Primary Examiner — Brendan Higa
(74) Attorney, Agent, or Firm — D. Kligler IP Services Ltd.

(57) ABSTRACT

A method for data storage includes, in a system that includes multiple servers, multiple multi-queue storage devices and at least one storage controller that communicate over a network, running, in a server among the servers, multiple data-path instances (DPs) that operate independently of one another and issue storage commands for execution in the multi-queue storage devices. The storage commands, issued by the multiple DPs running in the server, are multiplexed using an Input-Output Multiplexer (I/O MUX) process. The multiplexed storage commands are executed in the multi-queue storage devices.

10 Claims, 4 Drawing Sheets

(56) References Cited

U.S. PATENT DOCUMENTS

| | | | |
|---|---|---|---|
| 8,897,315 | B1 | 11/2014 | Arad et al. |
| 9,112,890 | B1* | 8/2015 | Ori ........................... G06F 3/06 |
| 9,164,689 | B2 | 10/2015 | O'Brien |
| 9,251,052 | B2 | 2/2016 | Talagala et al. |
| 9,274,720 | B1 | 3/2016 | Ori |
| 9,525,737 | B2 | 12/2016 | Friedman |
| 9,529,542 | B2 | 12/2016 | Friedman et al. |
| 9,842,084 | B2 | 12/2017 | Freindman et al. |
| 2002/0103923 | A1 | 8/2002 | Cherian et al. |
| 2003/0028725 | A1 | 2/2003 | Naberhuis et al. |
| 2003/0067942 | A1 | 4/2003 | Altenbernd et al. |
| 2003/0105830 | A1* | 6/2003 | Pham .................. H04L 63/0281 709/216 |
| 2004/0068558 | A1 | 4/2004 | De Miguel |
| 2004/0153576 | A1 | 8/2004 | Hansmann et al. |
| 2005/0050273 | A1 | 3/2005 | Horn et al. |
| 2006/0031450 | A1 | 2/2006 | Unrau et al. |
| 2006/0179197 | A1* | 8/2006 | Chung ................ G06F 12/0831 710/242 |
| 2007/0050591 | A1 | 3/2007 | Boyd et al. |
| 2007/0168396 | A1 | 7/2007 | Adams et al. |
| 2010/0153617 | A1 | 6/2010 | Miroshnichenko et al. |
| 2010/0250831 | A1 | 9/2010 | O'Brien et al. |
| 2011/0060887 | A1 | 3/2011 | Thatcher et al. |
| 2011/0246720 | A1 | 10/2011 | Nakamura et al. |
| 2011/0296133 | A1 | 12/2011 | Flynn et al. |
| 2012/0079318 | A1 | 3/2012 | Colgrove et al. |
| 2012/0144110 | A1 | 6/2012 | Smith |
| 2012/0233396 | A1 | 9/2012 | Flynn et al. |
| 2013/0031234 | A1 | 1/2013 | Alfano et al. |
| 2013/0046949 | A1 | 2/2013 | Colgrove et al. |
| 2013/0138836 | A1 | 5/2013 | Cohen et al. |
| 2013/0179649 | A1 | 7/2013 | Green et al. |
| 2013/0198312 | A1 | 8/2013 | Tamir et al. |
| 2013/0275447 | A1 | 10/2013 | Ben-Tsion et al. |
| 2014/0040411 | A1 | 2/2014 | Weber et al. |
| 2014/0136808 | A1 | 5/2014 | Colgrove et al. |
| 2014/0189032 | A1 | 7/2014 | Sugimoto et al. |
| 2014/0195849 | A1 | 7/2014 | Parladori et al. |
| 2014/0245444 | A1* | 8/2014 | Lutas ................... G06F 12/109 726/24 |
| 2014/0289462 | A9 | 9/2014 | Malwankar |
| 2015/0012699 | A1 | 1/2015 | Rizzo et al. |
| 2015/0127923 | A1 | 5/2015 | Miller et al. |
| 2015/0212752 | A1 | 7/2015 | Nemazie et al. |
| 2016/0004642 | A1 | 1/2016 | Sugimoto et al. |
| 2016/0034418 | A1 | 2/2016 | Romem et al. |
| 2016/0057224 | A1 | 2/2016 | Ori |
| 2016/0134703 | A1 | 5/2016 | Ori |
| 2016/0154834 | A1 | 6/2016 | Friedman |
| 2016/0162209 | A1 | 6/2016 | Calderone |
| 2016/0366226 | A1 | 12/2016 | Friedman et al. |
| 2018/0060274 | A1 | 3/2018 | Friedman et al. |

OTHER PUBLICATIONS

NVM Express, Revision 1.2, 205 pages, Nov. 3, 2014.

NVM Express, Revision 1.2a, 209 pages, Oct. 23, 2015.

Mitchell et al., "Using One-Sided RDMA Reads to Build a Fast,CPU-Efficient Key-Value Store", USENIX Annual Technical Conference, pp. 103-114, Jun. 26-28, 2013.

Rodeh, O., "B-trees, Shadowing, and Clones", ACM Transactions on Storage, vol. 3, No. 4, article 15, 27 pages, Feb. 2008.

Rodeh, O., "B-trees, Shadowing, and Clones", 2007 Linux Storage & Filesystem Workshop, San Jose, USA, 51 pages, Feb. 12-13, 2007.

Rodeh et al., "BTRFS: The Linux B-Tree Filesystem", ACN Transactions on Storage, vol. 9, No. 3, article 9, 32 pages, Aug. 2013.

Lim et al., "SILT: A memory-efficient, high-performance key-value store", Proceedings of the 23rd ACM Symposium on Operating Systems Principles, 13 pages, year 2011.

Behringer et al., "Memory Management for Concurrent RDMA: A Design for a Key-Value Store", 86 pages, Jun. 3, 2014.

\* cited by examiner

STORAGE IN MULTI-QUEUE STORAGE DEVICES USING QUEUE MULTIPLEXING AND ACCESS CONTROL

CROSS-REFERENCE TO RELATED APPLICATIONS

This application claims the benefit of U.S. Provisional Patent Application 62/449,131, filed Jan. 23, 2017, whose disclosure is incorporated herein by reference.

FIELD OF THE INVENTION

The present invention relates generally to data storage, and particularly to methods and systems for distributed storage.

BACKGROUND OF THE INVENTION

Various techniques for distributed data storage are known in the art. For example, U.S. Pat. No. 9,112,890, whose disclosure is incorporated herein by reference, describes a method for data storage including, in a system that includes one or more storage controllers, multiple servers and multiple multi-queue storage devices, assigning in each storage device server-specific queues for queuing data-path storage commands exchanged with the respective servers. At least some of the data-path storage commands are exchanged directly between the servers and the storage devices, not via the storage controllers, to be queued and executed in accordance with the corresponding server-specific queues.

SUMMARY OF THE INVENTION

An embodiment of the present invention that is described herein provides a method for data storage including, in a system that includes multiple servers, multiple multi-queue storage devices and at least one storage controller that communicate over a network, running, in a server among the servers, multiple data-path instances (DPs) that operate independently of one another and issue storage commands for execution in the multi-queue storage devices. The storage commands, issued by the multiple DPs running in the server, are multiplexed using an Input-Output Multiplexer (I/O MUX) process. The multiplexed storage commands are executed in the multi-queue storage devices.

In some embodiments, executing the multiplexed storage commands includes, in a given multi-queue storage device, queuing the storage commands issued by the multiple DPs running in the server in a single queue pair (QP) associated with the I/O MUX process.

In an embodiment, multiplexing the storage commands includes running the I/O MUX process in the server. In an alternative embodiment, multiplexing the storage commands includes running the I/O MUX process in a gateway separate from the server. The method may further include running in the gateway an access-control process that enforces an access-control policy on the storage commands.

In a disclosed embodiment, multiplexing and executing the storage commands includes accessing the multi-queue storage devices using remote direct memory access, without running code on the at least one storage controller.

There is additionally provided, in accordance with an embodiment of the present invention, a computing system including multiple multi-queue storage devices, at least one storage controller, and multiple servers. A server among the servers is configured to run multiple data-path instances (DPs) that operate independently of one another and issue storage commands for execution in the multi-queue storage devices. A processor in the computing system is configured to multiplex the storage commands issued by the multiple DPs running in the server using an Input-Output Multiplexer (I/O MUX) process, so as to execute the multiplexed storage commands in the multi-queue storage devices.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for distributed data storage. The disclosed techniques are typically implemented in a computing system comprising multiple servers that store data in multiple shared multi-queue storage devices, and one or more storage controllers. The servers run data-path instances (DPs) that execute storage commands in the storage devices on behalf of user applications. Among other tasks, the DPs perform logical-to-physical address translation and implement redundant storage such as RAID. Computing systems of this sort are described, for example, in U.S. Pat. Nos. 9,112,890, 9,274,720, 9,519,666, 9,521,201, 9,525,737 and 9,529,542, whose disclosures are incorporated herein by reference.

In order to improve performance (e.g., increase the number of I/O operations per second—IOPS—and increase throughput) a given server may run two or more DPs in parallel. In some embodiments, the server further comprises an Input/Output multiplexer (I/O MUX) that multiplexes storage commands (e.g., write and read commands) from the various DPs vis-à-vis the storage devices. In other embodiments, the I/O MUXs are not implemented in the servers but on separate gateways. In the latter embodiments, the I/O MUXs may also carry out additional operations, such as enforce access control policies.

By employing I/O MUXs, the multi-queue storage devices are able to hold a respective queue (or queue pair—QP) per I/O MUX rather than per data-path instance (DP). As a result, system scalability is enhanced significantly. Current NVMe disks, as a non-limiting example, are typically limited to a maximum of 128 queues per disk. Without I/O multiplexing, the system would be limited to no more than 128 DPs. By using the disclosed multiplexing schemes, the number of DPs per server, and the total number of DPs in the system, are virtually unlimited.

System Description

Figure 1:
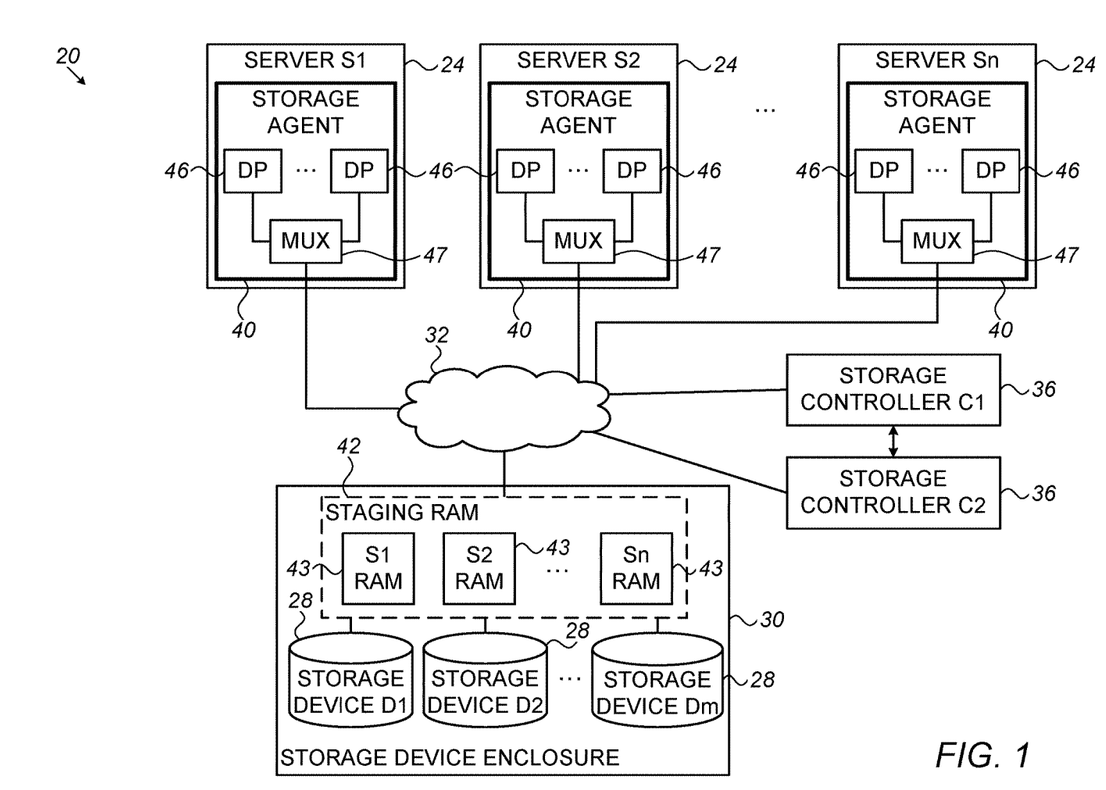
FIG. 1 is a block diagram that schematically illustrates a computing system that uses distributed data storage, in accordance with an embodiment of the present invention.

FIG. 1 is a block diagram that schematically illustrates a computing system 20, in accordance with an embodiment of the present invention. System 20 may comprise, for example, a data center, a High-Performance Computing (HPC) cluster, or any other suitable system. System 20 comprises multiple servers 24 denoted S1 . . . Sn, and multiple storage devices 28 denoted D1 . . . Dm. The servers and storage devices are interconnected by a communication network 32. The system further comprises one or more storage controllers 36 that manage the storage of data in storage devices 28.

In the disclosed techniques, data-path operations such as writing and readout are performed directly between the servers and the storage devices, without having to trigger or run code on the storage controller CPUs. The storage controller CPUs are involved only in relatively rare control-path operations. Moreover, the servers do not need to, and typically do not, communicate with one another or otherwise coordinate storage operations with one another. Coordination is typically performed by the servers accessing shared data structures that reside, for example, in the memories of the storage controllers.

In the present example, although not necessarily, storage devices 28 are comprised in a storage-device enclosure 30, e.g., a rack, drawer or cabinet. Enclosure 30 further comprises a staging Random Access Memory (RAM) unit 42 that comprises multiple staging RAMS 43. The staging RAM unit is used as a front-end for temporary caching of I/O commands en-route from servers 24 to storage devices 28. Staging RAMS 43 are therefore also referred to herein as interim memory. Enclosure 30 may also comprise a Central Processing Unit (CPU—not shown). The staging RAM and staging RAM unit are also referred to herein as "NVRAM cache" or "cache memory." The use of staging RAMS 42 is advantageous, for example, in various recovery processes. Moreover, the use of staging RAMS 42 essentially converts write workloads having low queue depth (e.g., queue depth of 1) into write workloads having a high queue depth, thereby significantly improving the average write latency, throughput and IOPS of such workloads.

Storage-related functions in each server 24 are carried out by a respective storage agent 40. Agents 40 typically comprise software modules installed and running on the respective servers. In some embodiments described herein, a storage agent 40 may comprise one or more Data-Path (DP) modules 46. DP modules 46 are also referred to herein as "DP instances" or simply as DPs. DPs 46 perform storage related functions for user applications running in the server.

A given agent 40 on a given server 24 may run multiple DPs 46, e.g., for increasing throughput and IOPS. In a typical implementation, each DP is pinned to a specific CPU core of the server, and each DP operates independently of the other DPs. When a given agent 40 comprises two or more DPs 46, an I/O multiplexer (MUX) 47 multiplexes the communication between DPs 46 of that agent 40 vis-à-vis staging RAMS 43 and storage devices 28. Running multiple independent DPs on a server is highly effective in achieving scalability and performance improvement, while avoiding various kinds of resource contention.

The functions of agents 40, including DPs 46 and 47, and their interaction with the other system elements, are described in detail below. In the example of FIG. 1, each agent 40 (and thus each server 24) comprises two DPs 46. Alternatively, different agents 40 (and thus different servers 24) may comprise different numbers of DPs 46. Any agent 40 (and thus each server 24) may comprise any suitable number of DPs 46. When a certain agent 40 comprises only a single DP, MUX 47 in that agent may be omitted.

I/O MUX 47 may run, for example, in a dedicated software thread on the CPU of server 24. Alternatively, MUX 47 may run in the same software thread as one of DPs 46. In some embodiments, a given server 24 may comprise two or more MUX 47, each serving a subset of the DPs 46 running in the server. Further alternatively, MUX 47 need not necessarily run in server 24, and may alternatively run on any suitable processor in system 20. For example, FIG. 4 below depicts an alternative system configuration in which I/O MUXs 47 run in gateways that are separate from servers 24.

Servers 24 may comprise any suitable computing platforms that run any suitable applications. In the present context, the term "server" includes both physical servers and virtual servers. For example, a virtual server may be implemented using a Virtual Machine (VM) that is hosted in some physical computer. Thus, in some embodiments multiple virtual servers may run in a single physical computer. Storage controllers 36, too, may be physical or virtual. In an example embodiment, the storage controllers may be implemented as software modules that run on one or more physical servers 24.

Storage devices 28 may comprise any suitable storage medium, such as, for example, Solid State Drives (SSD), Non-Volatile Random Access Memory (NVRAM) devices or Hard Disk Drives (HDDs). In an example embodiment, storage devices 28 comprise multi-queued SSDs that operate in accordance with the NVMe specification. In such an embodiment, each storage device 28 provides multiple queues for storage commands. The storage devices typically have the freedom to queue, schedule and reorder execution of storage commands. The terms "storage commands" and "I/Os" are used interchangeably herein.

Network 32 may operate in accordance with any suitable communication protocol, such as Ethernet or Infiniband. In some embodiments, some of the disclosed techniques can be implemented using Direct Memory Access (DMA) and/or Remote Direct Memory Access (RDMA) operations. The embodiments described below refer mainly to RDMA protocols, by way of example. Various variants of RDMA may be used for this purpose, e.g., Infiniband (IB), RDMA over Converged Ethernet (RoCE), Virtual Interface Architecture and internet Wide Area RDMA Protocol (iWARP). Further alternatively, the disclosed techniques can be implemented using any other form of direct memory access over a network, e.g., Direct Memory Access (DMA), various Peripheral Component Interconnect Express (PCIe) schemes, or any other suitable protocol. In the context of the present patent application and in the claims, all such protocols are referred to as "remote direct memory access." Any of the RDMA operations mentioned herein is performed without triggering or running code on any storage controller CPU.

Generally, system 20 may comprise any suitable number of servers, storage devices and storage controllers. In the present example, the system comprises two storage controllers denoted C1 and C2, for resilience. In an example embodiment, both controllers are continuously active and provide backup to one another, and the system is designed to survive failure of a single controller.

In the embodiments described herein, the assumption is that any server 24 is able to communicate with any storage device 28, but there is no need for the servers to communicate with one another. Storage controllers 36 are assumed to be able to communicate with all servers 24 and storage devices 28, as well as with one another.

Figure 2:
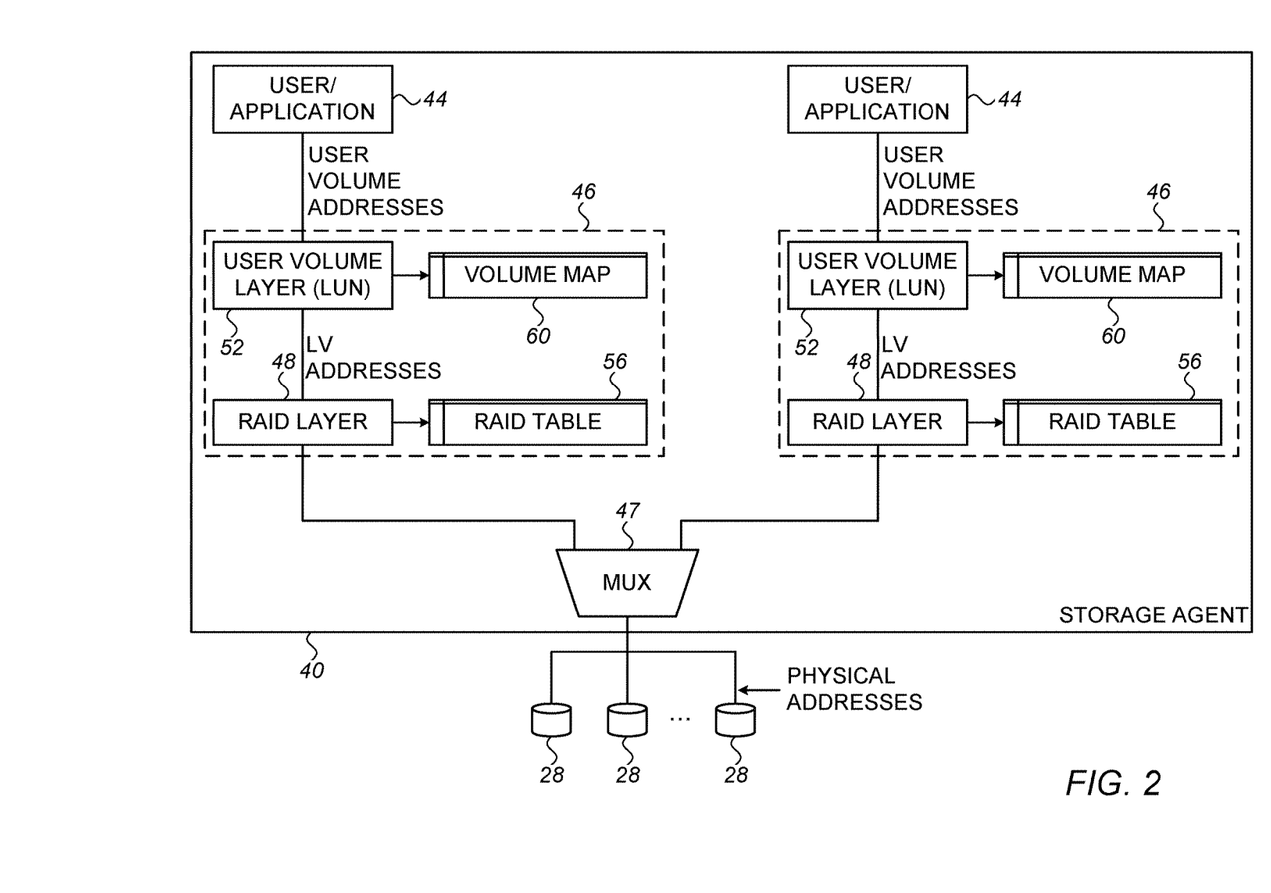
FIG. 2 is a block diagram that schematically illustrates elements of a storage agent used in the system of FIG. 1, in accordance with an embodiment of the present invention.

FIG. 2 is a block diagram that schematically illustrates elements of storage agent 40, in accordance with an embodiment of the present invention. A respective storage agent of this sort typically runs on each server 24.

As noted above, servers 24 may comprise physical and/or virtual servers. Thus, a certain physical computer may run multiple virtual servers 24, each having its own respective storage agent 40. FIG. 2 depicts an example in which agent 40 comprises two DPs 46. As noted above, agent 40 may alternatively comprise any suitable number of DPs, or even a single DP.

In some embodiments, each DP 46 performs storage-related functions for one or more user applications 44 running on server 24. Typically, different DPs 46 in a given storage agent 40 (in a given server 24) access storage devices 28 independently of one another.

Each DP 46 comprises a Redundant Array of Independent Disks (RAID) layer 48 and a user-volume layer 52. RAID layer 48 carries out a redundant storage scheme over storage devices 28, including handling storage resiliency, detection of storage device failures, rebuilding of failed storage devices and rebalancing of data in case of maintenance or other evacuation of a storage device. RAID layer 48 also typically stripes data across multiple storage devices 28 for improving storage performance.

In one simple example embodiment, RAID layer 48 implements a RAID-10 scheme, i.e., replicates and stores two copies of each data item on two different storage devices 28. One of the two copies is defined as primary and the other as secondary. The primary copy is used for readout as long as it is available. If the primary copy is unavailable, for example due to storage-device failure, the RAID layer reverts to read the secondary copy.

Alternatively, however, RAID layer 48 may implement any other suitable redundant storage scheme (RAID-based or otherwise), such as schemes based on erasure codes, RAID-1, RAID-4, RAID-5, RAID-6, RAID-10, RAID-50, multi-dimensional RAID schemes, or any other suitable redundant storage scheme.

Typically, RAID layer 48 stores data in stripes that are distributed over multiple storage devices, each stripe comprising multiple data elements and one or more redundancy elements (e.g., parity) computed over the data elements. In some embodiments the stripes are made up of data and redundancy blocks, but the disclosed techniques can be used with other suitable types of data and redundancy elements. The terms "parity" and "redundancy" are used interchangeably herein. One non-limiting example is RAID-6, in which each stripe comprises N data blocks and two parity blocks.

In each DP 46, RAID layer 48 accesses storage devices 28 using physical addressing. In other words, RAID layer 48 exchanges with storage devices 28 read and write commands, as well as responses and retrieved data, which directly specify physical addresses (physical storage locations) on the storage devices. In this embodiment, all logical-to-physical address translations are performed in DPs 46 within agents 40 in servers 24, and none in storage devices 28.

RAID layer 48 maps between physical addresses and Logical Volumes (LVs) to be used by user-volume layer 52. Each LV is mapped to two or more physical-address ranges on two or more different storage devices. The two or more ranges are used for storing the replicated copies of the LV data as part of the redundant storage scheme.

The redundant storage scheme (e.g., RAID) is thus hidden from user-volume layer 52. Layer 52 views the storage medium as a set of guaranteed-storage LVs. User-volume layer 52 is typically unaware of storage device failure, recovery, maintenance and rebuilding, which are handled transparently by RAID layer 48. (Nevertheless, some optimizations may benefit from such awareness by layer 52. For example, there is no need to rebuild unallocated storage space.)

User-volume layer 52 provides storage resources to applications 44 by exposing user volumes that are identified by respective Logical Unit Numbers (LUNs). The terms "user volume" and "LUN" are used interchangeably herein. In other words, a user application 44 views the storage system as a collection of user volumes, and issues storage commands having user-volume addresses.

In the embodiments described herein, the user-volume addresses are also referred to as User Block Addresses (UBAs) and the LV addresses are also referred to as RAID Block Addresses (RBAs). Thus, layer 52 in each DP 46 (within agent 40 running in server 24) translates between UBAs and RBAs.

Each DP 46 translates between the different address spaces using a RAID table 56 and a volume map 60. RAID table 56 holds the translation between LV addresses and physical addresses, and volume map 60 holds the translation between user-volume addresses and LV addresses.

Typically, any server 24 may attach to any user volume. A given user volume may have multiple servers attached thereto. In some embodiments, storage controllers 36 define and maintain a global volume map that specifies all user volumes in system 20. Volume map 60 in each DP 46 comprises a locally-cached copy of at least part of the global volume map. In agent 40 of a given server, volume maps 60 of DPs 46 hold at least the mapping of the user volumes (LUNs) to which this server is attached. In an embodiment, volume map 60 supports thin provisioning.

Multiplexing of Multiple Data-Path Instances

In the embodiments described herein, each I/O MUX 47 multiplexes storage commands of two or more DPs 46. The use of MUXs 47 enables each multi-queue storage device 28 to hold a respective queue per MUX 47, rather than per DP 46. Since storage devices are typically limited in the number of queues they are able to support, the disclosed embodiments enhance the scalability of system 20 considerably.

Figure 3:
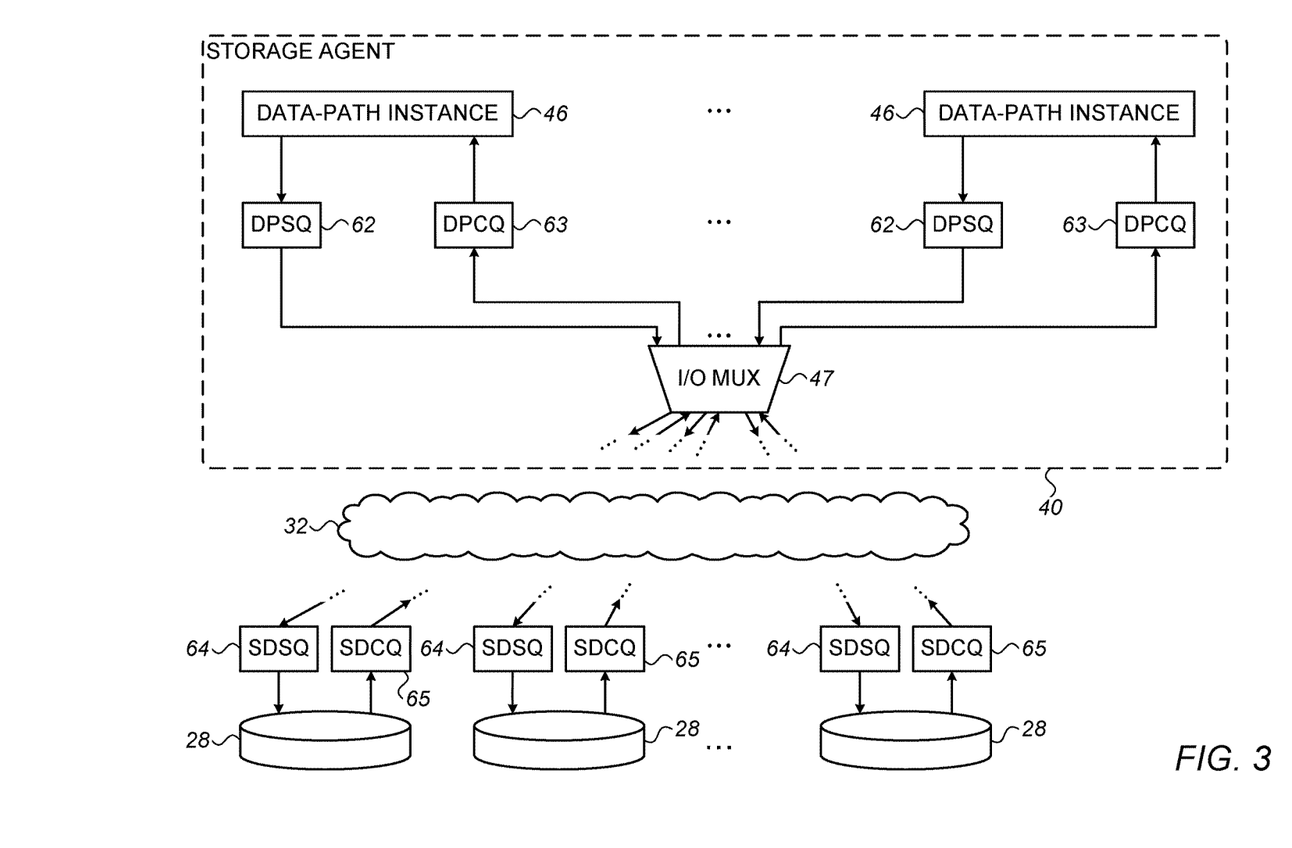
FIG. 3 is a block diagram that schematically illustrates queuing and I/O multiplexing elements in the computing system of FIG. 1, in accordance with an embodiment of the present invention.

FIG. 3 is a block diagram that schematically illustrates queuing and I/O multiplexing elements in system 20, in accordance with an embodiment of the present invention. In this example, storage agent 40 comprises multiple data-path instances (DPs) 46. Agent 40 maintains a respective Queue Pair (QP) per DP 46. Each QP comprises a DP Submission Queue 62 (DPSQ) and a DP Completion Queue (DPCQ) 63. In addition, each storage device 28 maintains a respective QP that comprises a Storage-Device Submission Queue (SDSQ) 64 and a Storage-Device Completion Queue (SDCQ) 65.

In one non-limiting example, each DPSQ 62 and each DPCQ 63 may be implemented as an in-memory shared cyclic queue, with a phase bit that toggles between "0" and "1" on each wraparound of the queue. The phase bit is typically used to determine the location of the producer. In one example implementation, the phase bit is initially set to "1" such that all commands submitted in the first cycle of the submission queue (until the first wraparound) have their phase bit set to "1". At the end of the cycle, when the cyclic queue wraps-around, the phase bit is set to "0", so that any new command is submitted with a "0" phase bit. Toggling continues in a similar manner for subsequent cycles. It is assumed that the queue is initially zeroed. Using this technique, a consumer can easily detect the position of the most-recently submitted command in the cyclic queue. The location of the consumer of a DPSQ is sent through the corresponding DPCQ, and vice versa.

A storage command issued by a DP 46 typically comprises (i) the type of command (e.g., read or write), (ii) relevant storage-device parameters such as LBA, (iii) remote staging RAM locations, and (iv) local data pointers for the RDMA transfer.

In an example embodiment, write commands are executed as follows:

Each DP 46 writes the data of the write commands it issues, using RDMA, to the locations in staging RAMS 43 specified in the commands.

Each DP 46 queues the write commands in its respective DPSQ 62. The queued command comprises parameters such as (i) storage-device ID, (ii) LBA and size, and (iii) staging RAM location ID.

I/O MUX 47 reads the write commands from the various DPSQs 62 and sends each write command to the SDSQ 64 of the appropriate storage device 28 (according to the storage device ID specified in the command). MUX 47 typically serves DPSQs 62 using a certain fair scheduling scheme, e.g., Round Robin.

Once a certain storage device 28 completes execution of a write command, the storage device writes a completion notification to its respective SDCQ 65.

MUX 47 reads the completion notifications from the various SDCQs 65 and sends each completion notification to the DPCQ 63 of the appropriate DP 46. In this direction, too, MUX 47 typically serves SDCQs 65 of the various storage devices 28 using Round Robin or other fair scheduling scheme.

Each DP 46 reads the completion notifications from its respective DPCQ 63, and performs completion processing accordingly. As part of the completion processing, the DP typically acknowledges completion to the appropriate application 44.

In an example embodiment, read commands are executed as follows:

Each DP 46 queues read commands in its respective DPSQ 62. The queued command comprises parameters such as (i) storage-device ID, (ii) LBA and size, and (iii) staging RAM location ID.

I/O MUX 47 reads the read commands from the various DPSQs 62 and sends each read command to the SDSQ 64 of the appropriate storage device 28.

Storage devices 28 read the read commands from their SDSQs, retrieve the data requested by each read command and store it in the respective staging RAM location.

Once a storage device 28 completes execution of a read command, the storage device writes a completion notification to its respective SDCQ 65.

MUX 47 reads the completion notifications from the various SDCQs 65 and sends each completion notification to the DPCQ 63 of the appropriate DP 46.

DP 46 reads the completion notification from its DPCQ 63, and reads the data of the read command from the staging RAM using RDMA to the buffer provided by the requesting application 44.

DP 46 then performs completion processing. As part of the completion processing, the DP typically acknowledges completion to application 44.

The write-command and read-command execution flows described above are example flows, which are depicted purely for the sake of conceptual clarity. In alternative embodiments, any other suitable flows can be used.

I/O Multiplexing and Access Control Implemented on Separate Gateways

Figure 4:
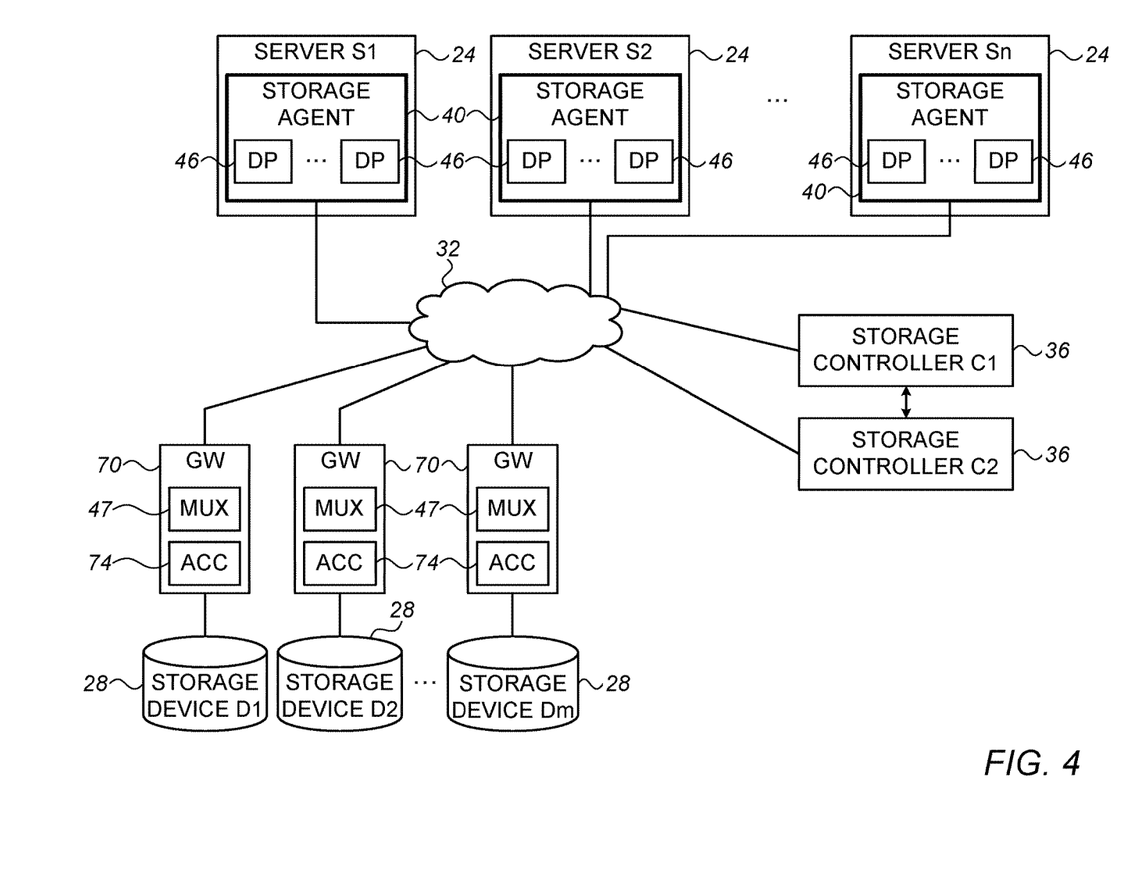
FIG. 4 is a block diagram that schematically illustrates a computing system that uses distributed data storage, in accordance with an alternative embodiment of the present invention.

FIG. 4 is a block diagram that schematically illustrates a computing system that uses distributed data storage, in accordance with an alternative embodiment of the present invention. In the present example, in contrast to the example of FIG. 1, I/O MUXs 47 are implemented in separate Gateways (GWs) 70 and not in servers 24. In the embodiment of FIG. 4, the system comprises a respective GW 70 for each storage device 28. GWs 70 may comprise, for example, dedicated computers or other processors, located at any suitable location in the system.

In some embodiments, each GW 70 further comprises a respective access control module (ACC) 74. Each ACC 74 permits or denies execution of storage commands on the respective storage device 28, in accordance with a certain access-control policy. For example, the policy may specify that each DP is allowed to access only volumes that are mapped thereto. Without access control, malicious hosts may illegitimately gain access to information they are not entitled to access on storage devices 28. In this example, each ACC 74 is notified of the volumes to which the various DPs 46 are mapped to, and is therefore able to permit or deny each storage command, as appropriate. In one embodiment, each ACC 74 is provided with a "reverse volume map" that maps RBA ranges to the (one or more) servers mapped to the volumes having these RBA ranges.

Additionally or alternatively, ACCs 74 may enforce any other suitable access-control policy. ACCs are typically configured with the policy by storage controllers 36.

In some embodiments, MUX 47 and ACC 74 are implemented as separate software processes on GW 70. In other embodiments, the functions of MUX 47 and ACC 74 on a given GW 70 may be carried out jointly by a single software module.

In the embodiment of FIG. 4, in which MUXs 47 are remote from agents 40, each agent 40 runs one or more "MUX DP" (MDP) modules, and each GW 70 runs one or more host-specific (i.e., server-specific) submission queues (HSQs) and one or more respective host-specific (i.e., server-specific) completion queues (HCQs). The MDPs, HSQs and HCQ are not shown in the figure for the sake of clarity.

An MDP in a certain agent 40 is defined as the consumer of some or all of DPSQs 62 of DPs 46 in that agent 40. Similarly, an MDP in an agent 40 is defined as the producer of some or all of DPCQs 63 of DPs 46 in that agent 40. In some embodiments, each agent comprises only a single MDP. In other embodiments, a given agent 40 may comprise two or more MDPs that run in different contexts, for enhancing performance. In such embodiments, each MDP is typically assigned to a respective subset of the DPs in agent 40. An MDP may run in the same context (e.g., same thread or same CPU core) as one of the DPs, or in a dedicated context.

Each MDP is configured to aggregate its assigned DPSQs in a fair manner, e.g., Round Robin, and to write each command (using RDMA) to the appropriate HSQ on the appropriate GW 70. In an embodiment, in order to preserve ordering, the same QPs are used for (i) RDMA writes that write data of write commands, and (ii) RDMA writes that write the write commands themselves.

In an example embodiment, write commands are executed in the system of FIG. 4 as follows:

- Each DP 46 writes the data of the write commands it issues, using RDMA, to the locations in staging RAMS 43 specified in the commands.
- Each DP 46 queues the write commands in its respective DPSQ 62. The queued command comprises parameters such as (i) storage-device ID, (ii) LBA and size, and (iii) staging RAM location ID.
- Each MDP copies the write commands from its assigned DPSQs 62 to the appropriate HSQ on the appropriate GW 70. The MDPs keep track of the original commands, in order to be able to post the completion notifications to the correct DPSQs. An MDP may coalesce and send two or more commands to a given HSQ, possibly originating from different DPSQs, at the same time.
- Each I/O MUX 47 reads the write commands from the HSQs on its respective GW 70, and sends each write command to the appropriate SDSQ 64 of the storage device 28. At this stage, ACC 74 may perform access-control checks, and selectively permit or deny access to the storage device, per the access-control policy.
- Once a certain storage device 28 completes execution of a write command, the storage device writes a completion notification to its respective SDCQ 65.
- I/O MUXs 74 read the completion notifications from the various SDCQs 65. Each MUX 74 posts the completion notifications it reads on the respective HCQ in the respective GW 70.
- The MDPs read the completion notifications from the HCQs and send each completion notification to the DPCQ 63 of the appropriate DP 46.
- Each DP 46 reads the completion notifications from its respective DPCQ 63, and performs completion processing accordingly. As part of the completion processing, the DP typically acknowledges completion to the appropriate application 44.

In an example embodiment, read commands in the system of FIG. 4 are executed as follows:

- Each DP 46 queues read commands in its respective DPSQ 62. The queued command comprises parameters such as (i) storage-device ID, (ii) LBA and size, (iii) staging RAM location ID, and (iv) local address and rkey.
- The MDPs copy the read commands from the various DPSQs 62 to the appropriate HSQs. The MDPs keep track of the original commands, in order to be able to post the completion notifications to the correct DPSQs. An MDP may coalesce and send two or more commands to a given HSQ, possibly originating from different DPSQs, at the same time.
- Each I/O MUX 47 reads the read commands from the HSQs on its GW 70, and sends each read command to the SDSQ 64 of the appropriate storage device 28. At this stage, ACC 74 may perform access-control checks, and selectively permit or deny access to the storage device, per the access-control policy.
- Storage devices 28 read the read commands from their SDSQs, retrieve the data requested by each read command, and store in the staging RAM.
- Once a storage device 28 completes execution of a read command, the storage device writes a completion notification to its respective SDCQ 65.
- Each MUX 47 reads the completion notifications from the various SDCQs 65 of its assigned storage device, and posts each completion notification on the appropriate HCQ.
- MUX 47 reads the completion notifications from the HCQ and sends each completion notification to the DPCQ 63 of the appropriate DP 46.
- DP 46 reads the completion notification from its DPCQ 63, and reads the data of the read command using RDMA to the buffer provided by the requesting application 44. Alternatively, the gateway may perform an RDMA write of the data directly to the buffer provided by application 44 along with posting a completion to the HCQ.
- DP 46 then performs completion processing. As part of the completion processing, the DP typically acknowledges completion to application 44.

A given I/O MUX 47, running on a given GW 70, may be implemented as a single-threaded or multi-threaded (or otherwise multi-core) process. In a multi-threaded MUX 47, each thread of the MUX typically runs on a dedicated core of GW 70 and is responsible for a configurable subset of servers 24. MUX 47 typically polls the HSQs of its designated servers 24, issues storage commands (I/Os) to storage devices 28, and polls the CQs of the storage devices. The CQs are multiplexed back into HCQs, which are in turn RDMA-written back to the servers. Similarly to the example implementation of the DPSQs and DPSQs, a phase bit and a consumer location are passed in the HSQ and HCQ. Upon completion of a read command, the relevant data is either RDMA-written to the server by the gateway, or RDMA-read by the server from the staging RAM.

The write-command and read-command execution flows described above are example flows, which are depicted purely for the sake of conceptual clarity. In alternative embodiments, any other suitable flows can be used. For example, in some embodiments the MDPs can be omitted, meaning that each DP essentially serves as an MDP.

The system configurations shown in FIGS. 1-3 are example configurations, which are chosen purely for the sake of conceptual clarity. In alternative embodiments, any other suitable system configurations can be used. For example, the system may comprise only a single storage controller 36. In other embodiments, the functionality of storage controllers 36 may be distributed among servers 24.

Certain aspects of distributed storage systems of the sort shown in FIGS. 1 and 2 are also addressed in U.S. Pat. Nos. 9,112,890, 9,274,720, 9,519,666, 9,521,201, 9,525,737, 9,529,542 and 9,842,084, cited above.

The different system elements may be implemented using suitable hardware, using software, or using a combination of hardware and software elements. Each server 24 typically comprises a suitable network interface for communicating over network 32, e.g., with the storage devices and/or storage controllers, and a suitable processor that carries out the various server functions. Each storage controller 36 typically comprises a suitable network interface for communicating over network 32, e.g., with the storage devices and/or servers, and a suitable processor that carries out the various storage controller functions.

In some embodiments, servers 24 and/or storage controllers 36 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

In some embodiments, I/O MUXs 47 may also be used to add extra features missing from the underlying storage devices 28. Non-limiting examples of such features may comprise atomic operations, reservations and copy offload operations. When processing storage commands, a MUX 47 may coordinate such atomic operations, lock ranges to implement reservations or offload copying data from one range to another by performing the copy by itself, without involving servers 24 or storage controllers 36.

Although the embodiments described herein mainly address block storage applications, the methods and systems described herein can also be used in other applications, such as in file and object storage applications, as well as in database storage.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
   in a system that comprises multiple servers, multiple multi-queue storage devices and at least one storage controller that communicate over a network, running, in a server among the servers, multiple data-path instances (DPs) that operate independently of one another and issue storage commands for execution in the multi-queue storage devices;
   using an Input-Output Multiplexer (I/O MUX) process, multiplexing the storage commands issued by the multiple DPs running in the server; and
   executing the multiplexed storage commands in the multi-queue storage devices, including, in a given multi-queue storage device, queuing the storage commands issued by the multiple DPs running in the server in a single queue pair (QP) associated with the I/O MUX process.

2. The method according to claim 1, wherein multiplexing the storage commands comprises running the I/O MUX process in the server.

3. The method according to claim 1, wherein multiplexing the storage commands comprises running the I/O MUX process in a gateway separate from the server.

4. The method according to claim 3, further comprising running in the gateway an access-control process that enforces an access-control policy on the storage commands.

5. The method according to claim 1, wherein multiplexing and executing the storage commands comprises accessing the multi-queue storage devices using remote direct memory access, without running code on the at least one storage controller.

6. A computing system, comprising:
   multiple multi-queue storage devices;
   at least one storage controller;
   multiple servers, wherein a server among the servers is configured to run multiple data-path instances (DPs) that operate independently of one another and issue storage commands for execution in the multi-queue storage devices; and
   a processor configured to multiplex the storage commands issued by the multiple DPs running in the server using an Input-Output Multiplexer (I/O MUX) process, so as to execute the multiplexed storage commands in the multi-queue storage devices,
   wherein a given multi-queue storage device is configured to queue the storage commands issued by the multiple DPs running in the server in a single queue pair (QP) associated with the I/O MUX process.

7. The system according to claim 6, wherein the processor, which is configured to multiplex the storage commands, is a processor in the server.

8. The system according to claim 6, wherein the processor, which is configured to multiplex the storage commands, is a processor in a gateway separate from the server.

9. The system according to claim 8, wherein the processor in the gateway is further configured to run an access-control process that enforces an access-control policy on the storage commands.

10. The system according to claim 6, wherein the server and the processor are configured to multiplex and execute the storage commands by accessing the multi-queue storage devices using remote direct memory access, without running code on the at least one storage controller.

\* \* \* \* \*